United States Patent Office 3,343,710
Patented Sept. 26, 1967

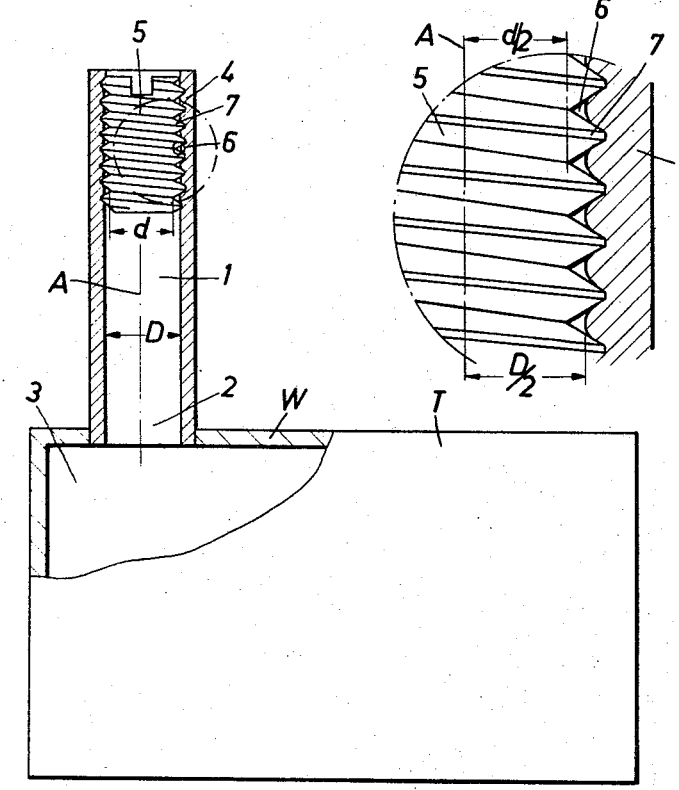
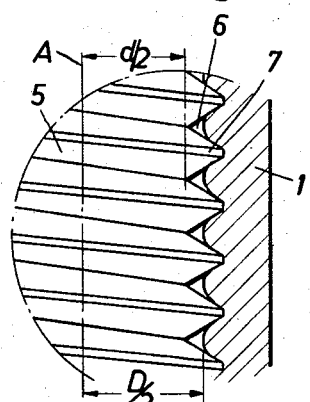

3,343,710
VENTING ARRANGEMENT, ESPECIALLY
FOR TANKS
Anton Wehle, Stuttgart, and Dietmar Mierzwa, Klein-Heppach, Germany, assignors to Andreas Stihl Maschinenfabrik, Neustadt, Waiblingen, Germany
Filed Nov. 27, 1964, Ser. No. 414,190
Claims priority, application Germany, Nov. 29, 1963,
St 16,522
4 Claims. (Cl. 220—44)

ABSTRACT OF THE DISCLOSURE

The present invention relates to a breathing arrangement for fuel tanks, according to which the fuel tank has connected thereto a tubular member of yieldable elastic material, as for instance rubber, which tubular member normally has an inner smooth surface In conformity with the invention, a standard threaded bolt or the like is inserted into the tubular member while the dimensions of the thread of said bolt and the inner diameter of said tubular member prior to the insertion of said bolt are such that when said threaded bolt is inserted into said tubular member, the latter only partially radially enters the thread of said bolt so as to confine therewith a helical passage.

---

The present invention relates to a venting arrangement, especially for tanks of an internal combustion engine tiltable into different positions of operation, as is the case for instance with the tank of an engine associated with a portable motor saw.

With heretofore known internal combustion engines of this type, the filler neck of a tank is provided with a filler cap having arranged therein a valve, for instance a diaphragm valve, adapted to permit air to flow from the outside into the interior of the tank and/or from the interior of the tank to the outside.

It is an object of the present invention to provide a venting arrangement for the above-mentioned purpose which will be simple and reliable.

It is also an object of this invention to provide a venting arrangement as set forth above which can easily be installed and cleaned whenever necessary.

These and other objects and advantages of the invention will appear more clearly from the following specification in connection with the accompanying drawing, in which:

FIG. 1 illustrates a longitudinal section through a tank venting arrangement according to the present invention;

FIG. 2 illustrates on a somewhat larger scale than that of FIG. 1 that portion of FIG. 1 which is shown within a dot-dash circle.

The venting arrangement according to the present invention is characterized primarily that into the outer wall of the tank there is inserted a tubular member the interior of which communicates with the interior of the tank, while furthermore the upper end portion of said tubular member has inserted therein a threaded stopper. The root diameter of the thread of said stopper between two windings measured transverse to the axis of the tubular member is less than the smallest inner diameter of the tubular member. Advantageously, the tubular member is formed by a hose of flexible material into which the outer marginal portion of the thread of said threaded stopper extends so that there remains a helical passage between the stopper and the inner wall of the tubular member which passage represents the venting passage.

Referring more specifically to the drawing, the arrangement shown therein illustrates a tank T associated for instance with an internal combustion engine not shown for a motor chain saw. The upper tank wall W has inserted therein a tubular member 1 of flexible material, as for instance rubber material. The lower end section 2 of said tubular member 1 is connected to the tank wall W in a liquid-tight manner by any standard means, as for instance by cementing the said section of the tubular member to the tank. The interior of tubular member 1 communicates with the interior 3 of tank T.

Inserted into the upper end section 4 of the tubular member 1 is a stopper 5, for instance in the form of a threaded stud or tap bolt. The root diameter $d$ at the bottom of stud 5 as measured between two thread windings 7 in a direction transverse to the longitudinal axis A of tubular member 1 is by about 0.5 to 2 millimeters shorter than the smallest inner diameter D of tubular member 1.

As will be evident in particular from FIG. 2, between two thread windings 7 which press themselves into the yieldable material of tubular member 1 and, more specifically, at the root of the said two thread windings there remains a venting passage 6 which is of triangular cross section. This venting passage 6 which following the helical thread 7 is itself helical, forms a labyrinth-like seal with regard to the fuel during the tilting movements occurring when the motor chain saw is being handled. Through the said venting passage 6 air may escape toward the outside when an over-pressure should prevail in the interior 3 of tank T, or air may pass into the interior of tank 7 during the normal withdrawal of fuel from the tank.

As will be evident from the above, the arrangement and design of the venting tubular member and stopper 5 represent a considerable simplification over venting arrangements heretofore known and in addition thereto are of considerably lower cost. The venting arrangement according to the present invention is particularly simple when a threaded bolt or tap bolt is employed in conformity with the invention.

It is, of course, to be understood that the present invention is, by no means, limited to the particular arrangement shown in the drawing but also comprises any modifications within the scope of the appended claims.

What we claim is:
1. In combination with a fuel tank having a top wall, especially for use in connection with portable internal combustion engines: a tubular member having one end portion connected to the top wall of said tank and having its interior in communication with the interior of said tank, at least the other end portion of said tubular member being of yieldable elastic material and normally having an inner smooth surface for receiving a closure member, and a closure member arranged in said other end portion of said tubular member and provided with a peripheral thread, the core diameter of said thread being less than the smallest inner diameter of said tubular member at said other end portion, and the outer diameter of said thread being at least slightly greater than the smallest inner diameter of said tubular member so that the inner wall of said other end portion of said tubular member only partially enters said thread and thereby together with adjacent inner wall surface portions of said tubular member forms a helical venting passage leading from the inner end of said thread to the atmosphere.

2. An arrangement according to claim 1, in which at least that portion of the tubular member which is engaged by the thread of said closure member consists of rubber material.

3. An arrangement according to claim 1, in which said closure member is a screw bolt.

4. An arrangement according to claim 1, in which said closure member is a threaded tap bolt.

References Cited

UNITED STATES PATENTS 2,263,644   11/1941   Pierce.
3,147,876   9/1964   Lepore _____ 215—56

THERON E. CONDON, *Primary Examiner.*

J. B. MARBERT, *Assistant Examiner.*